July 25, 1967 T. G. BIXBY 3,332,312
EXPANSION STUD ANCHOR
Original Filed Jan. 28, 1964 3 Sheets-Sheet 1

Inventor
Thomas G. Bixby
By Silverman + Cass
Attorneys

3,332,312
Patented July 25, 1967

3,332,312
EXPANSION STUD ANCHOR
Thomas G. Bixby, Valparaiso, Ind., assignor to Phillips Drill Company, Michigan City, Ind., a corporation of Illinois
Continuation of application Ser. No. 482,037, Aug. 18, 1965, which is a continuation of application Ser. No. 340,768, Jan. 28, 1964. This application Feb. 16, 1967, Ser. No. 616,735
14 Claims. (Cl. 85—83)

ABSTRACT OF THE DISCLOSURE

An expansion stud anchor which is to be set into a hole that has been drilled in a concrete body in which the anchor is a solid steel member having a threaded stud end adapted to protrude out of the hole after the anchor has been set, and having a hollow bore extending part way into the end opposite the stud end. The bore end of the anchor is slotted so that it can expand when driven into the hole, and the anchor includes a conical plug which is driven into the bore to expand that end of the anchor during setting. The plug is so constructed and has such a relationship with the bore that it does not fully enter the bore when the anchor is set thereby leaving an annular space for cuttings produced as the anchor is being set, these cuttings being scraped from the wall of the concrete hole. The plug has three parts, one being a flanged end of approximately the same diameter as the hole and the anchor, the second being a tapered end to lead the plug into the bore, the third being a cylindrical section between the tapered part of the flange, the cylindrical section and the largest diameter of the tapered section both being substantially smaller than the diameter of the hole. The construction is such that proper use of the anchor will provide the space for the cuttings to prevent the plug from being locked in the hole, and, in addition, this construction as described enables the anchor to be set into a hole which has been drilled and not cleaned out.

---

This application is a continuation of my application Ser. No. 482,037, filed Aug. 18, 1965, now abandoned, which was a continuation of application Ser. No. 340,768, filed Jan. 28, 1964, now abandoned, which was a continuation-in-part of my application, Ser. No. 316,104, filed Oct. 14, 1963, now abandoned.

This invention relates generally to anchors for installation in concrete and masonry to enable equipment and apparatus of various types securely, and if desired, removably to be attached to the surface of a prefinished concrete or masonry wall, floor or ceiling; more particularly the invention is concerned with an expansion stud anchor for providing a threaded stud protruding from the wall, floor or ceiling whereby the equipment or apparatus can be mounted to said surface by means of a threaded nut engaged with the stud.

The particular type of anchor with which this invention as well as that of said copending applications is concerned differs from the so-called self-drilling anchor or shell in many respects. In the case of the expansion stud anchor, a hole is first drilled in the concrete or masonry with a suitable drill, such as a carbide-tipped drill, and the anchor is inserted and set directly into the hole. The anchor is in the form of a threaded stud having a shank of any desirable length and having a hollow recess at the opposite end. The hollow end is slotted, and a tapered conical plug is inserted into the hollow end which expands the said end when the anchor is set, to hold the stud permanently anchored in the drilled hole.

The stud protrudes from the hole to enable a bracket, hanger, machinery leg or the like article having a conforming hole or slot to be engaged upon the stud and fastened in place by a threaded nut that engages with the stud. Often the article is already in place and the hole in the masonry or concrete is drilled directly through the hole in the article or piece of equipment and the anchor set without moving the article.

The advantages of the hollow self-drilling concrete and masonry anchor or shell are too well-known to require explanation and too time-tested through many years of world-wide and universal use to be derogated. There are certain differences between the self-drilling shell and the stud anchor of the type here involved which are not necessarily exclusive with anchors constructed in accordance with the invention herein, but which, perhaps, should be pointed out to aid in an understanding of this invention.

The self-drilling type of expansion anchor must have a diameter which is substantially larger than the diameter of the bolt to be used with it because the self-drilling shell is hollow and the fastening bolt is adapted to be screwed into the shell. The hole in the masonry or concrete therefore must be larger in diameter than that of the stud anchor, but this disadvantage is to some extent, at least, offset by the fact that the expansion plug of the self-drilling shell is larger (for any given size of shell or anchor) than that of the stud anchor, acts on a larger slotted end, exerts a greater force and is more securely anchored.

The invention herein, as well as that of the copending applications has as its primary object, the provision of a stud anchor which will be capable of expansion to a secure connection with the concrete or masonry in which it is installed, notwithstanding the fact that the size of the expansion plug and the diameter of the anchor are substantially smaller, respectively than the size of plug and diameter of self-drilling shells of the same rated size. (Rated size may be defined as the size of the threaded bolt which will be accepted by the hollow bore of the self-drilling shell and the size of the threaded stud integral with the stud anchor.)

The self-drilling shell has axial teeth formed at its bottom end which cut the concrete or masonry as the shell is hammered and oscillated and hence the shell must be hardened. Since the stud anchor is not used for drilling, it need not be hardened and hence is not heat-treated after being made. The material used preferably is cold rolled bar stock steel.

The self-drilling shell is set by removing the shell after it has drilled its own hole, which, of course, will always be the correct size, cleaning out the hole in any suitable manner such as for example by means of a rubber squeeze bulb, then inserting the tapered plug in the bottom bore, re-inserting the shell in its hole, and driving the shell down upon its plug. As the plug enters the bore of the self-drilling shell, it splits the shell along the grooves which are pre-formed in its walls, expands the bottom end in the hole and securely fixes the shell in the hole.

In the course of setting the self-drilling shell, it is believed that there is an under-cutting of the hole by the hardened teeth, even though these same teeth have previously been used to drill the hole. The debris and cuttings from the undercutting operation are accommodated in the large opened slot of the shell wall and between the teeth. The sizes of such self-drilling shells were such that a substantial amount of surface contact between the expansion plug and the bore practically insured against pull-out during taking up of the bolt within the threaded hole in the shell.

Later forms of this shell used a construction without teeth. A large hole was drilled in the concrete or masonry by a carbide-tipped drill or the like, and the toothless shell was inserted with a tapered plug in its hollow bore, slotted end and driven home. The end expanded in the bottom of the hole and provided a secure connection. Again, size and engagement area were practically insurance against pull-out during taking up of the bolt within the threaded end of the shell. In a novel structure which is disclosed in U.S. Patent 3,122,049 such a toothless shell has broaching grooves on its exterior surface, terminating in an end ring which undercuts the hole as the shell is set. The plug used with such shell is conical and there is an annular space provided on the interior of the shell adjacent the bottom end for the accommodation of at least some of the resulting cuttings.

The objects of the co-pending applications are intended for the invention herein as well, and these include the following:

(1) Enabling an expansion plug to be inserted in the bore of a stud anchor after the parts have been manufactured, this being done by the maker as an assembly operation, so that the user always has a single unit to handle, with the plug tightly in place, and of the proper size.

(2) Providing the assembled relationship between plug and anchor so that the plug will not separate from the anchor while being inserted into the hole preparatory to setting the same, this also ensuring that the axial disposition of the plug relative to the anchor and drilled hole is correct.

(3) Preventing the bottom end of the drilled hole from being crushed during setting of the anchor thereby assuring the proper depth of setting and the proper expansion of the anchor.

(4) Preventing debris and cuttings in the bottom of the drilled hole from getting between the plug and anchor, such cuttings in the location mentioned otherwise being a factor in preventing full expansion of the anchor during setting and in preventing locking of the plug in the hole during take-up.

(5) Preventing deformation of the threaded end of the anchor during setting.

(6) Providing a tight fit at the point of entry of the anchor into the concrete and giving an indication of the proper depth that the anchor is to be driven during setting.

The first two of these objects are achieved by providing a cylindrical section at the smallest or entrant end of the tapered expansion plug, and providing a hollow bore in the expansion shell which makes an interference fit therewith. Before packing the anchors the manufacturer assembles them by forcing the cylindrical entrant end into the bore of the shell so that the plug is accurately and almost irretractably engaged therein. The user does not disturb this connection at any time until the plug is driven further into the bore during setting.

The next two of these objects are achieved by providing the bottom end of the tapered plug with a shouldered flange the diameter of which is substantially greater than the bore of the shell, but slightly smaller than that of the drilled hole so as freely to slide within the hole. The force applied to the bottom of the hole during setting is diffused over a greater area than if the plug were not provided with this base, so that the plug end does not sink into the concrete in lieu of causing the anchor end to expand. In situations where the hole has not been cleaned out, the cuttings cannot be forced past the flange where they would interfere with expansion by compressing and blocking anchor movement, or locking the plug in the hole, but instead they are compressed under the flange to provide a solid mass against which the plug can be engaged during setting.

The fifth object is accomplished by having a reduced diameter driving head on the outer stud end of the anchor.

The sixth object is achieved by providing a knurled annular band on the shank of the anchor at a predetermined axial location.

In the said co-pending applications, the anchor has a construction which included exterior annular broaching rings or teeth terminating at the bottom end in an undercutting ring. The bottom end had a hollow bore to receive the tapered plug, and there was an annular countersunk space for the accommodation of debris caused by undercutting during setting. The plug itself was fully tapered along its entire length, but for the entrant end, with the largest or root diameter of the conical section somewhat smaller than the diameter of the shouldered flange.

While this construction gave satisfactory performance under many conditions, it was found that the variations of such conditions and the vagaries and uncertainties of many factors did not make this type of construction so fool-proof that it could be relied upon to perform in most conditions. It was found that the taking up of the stud of the anchor by application of the axial force during tightening of the securing nut would often pull the anchor free of the plug and out of the hole.

The factors which are believed to affect anchor setting were studied, and several of these are as follows:

(1) The density and composition of the concrete or masonry and the resulting cuttings and debris.

(2) The type of drill used to drill the hole.

(3) The amount of cuttings left in the hole by the workman.

(4) The moisture present at the situs of the hole.

(5) The amount of movement imparted inwardly during setting.

It was found that the most likely cause of pull-out during taking up was the compression of cuttings between the anchor end and the expansion plug during setting to form an almost solid mass locking the plug in the hole independently of the anchor. This would additionally resist movement of the anchor upon the plug and upon repeated application of hammer blows might bodily move the entire assemblage including anchor and plug into the hole without forcing the plug into the anchor bore. Obviously, pulling the anchor out of the hole as in taking up on the same, would merely separate the anchor and plug. Oversetting an anchor by forcing the shell further than needed onto the plug could have the same effect.

Accordingly, the invention herein improved upon the construction of the copending applications by increasing the universality of the anchor so that it could be relied upon in practically all applications, without concern over pull-out during take-up.

To accomplish this improvement, and as another object of the invention, the plug was provided with a configuration that included a cylindrical section between the tapered section and the shouldered flange, thereby providing a large annular space or chamber which could accommodate a substantial amount of cuttings produced by undercutting of the hole during setting of the anchor, so that a compressed mass would not be formed. The anchor was adapted to be driven onto and expanded by the tapered section only, thereby not requiring that the expansion plug enter into the bore of the shell as deeply as described in connection with said copending applications. When the anchor is properly set, substantially all of the intermediate cylindrical section protrudes out of the bore of the anchor so as to ensure sufficient cuttings space. As a matter of fact the condition just described is practically an essential to complete reliability.

An important object of this invention is to provide a stud anchor which has means built into it to enable a workman to sense by the feel of the hammer against the anchor end when the same has been fully set in its hole, so that the optimum depth of the expansion plug in the bore of the anchor is positively achieved.

Still a further object of the invention is to provide a construction of expansion stud anchor adapted to be installed in a predrilled hole which does not require the hole to be cleaned out, but which provides a reliable anchoring connection by merely setting the anchor directly into the hole on top of the drilling cuttings.

Other objects of the invention will become apparent from a description of the invention which follows in connection with which there are illustrated several examples showing the manner in which the invention is carried out, there being included in such examples preferred embodiments of the invention as well as modified forms thereof.

Figure 1:
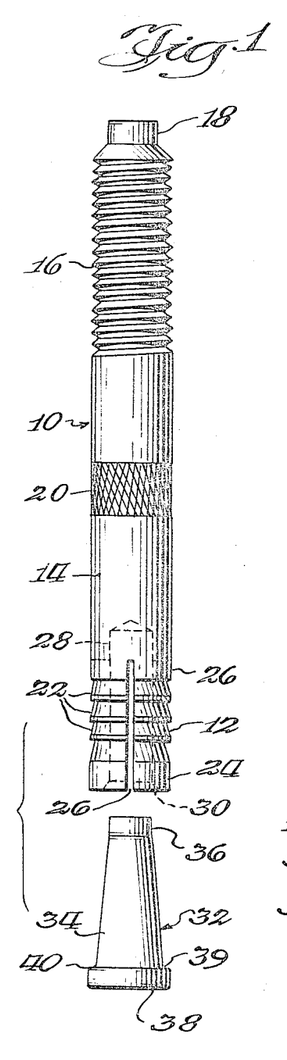
FIG. 1 is an exploded side elevational view showing an expansion stud anchor and its expansion plug, the same being of the construction disclosed in the said co-pending applications.
Figure 2:
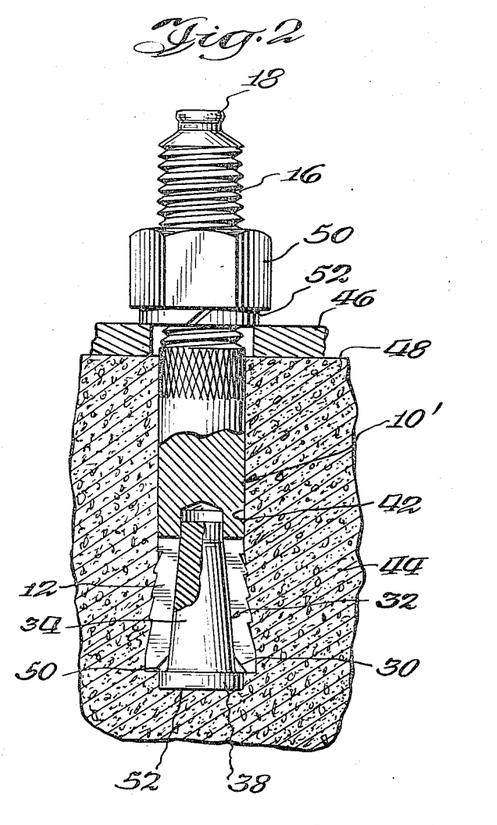
FIG. 2 is a sectional view taken through a slightly modified form of the anchor and plug of FIG. 1 showing the same installed in a hole in masonry or the like, portions being broken away and portions being shown in elevation.

Looking now at the drawings, FIGS. 1 and 2 comprise illustrations of the anchor with its plug constructed in accordance with the copending applications. This anchor was effective but only under certain ideal conditions and did not have the universality characteristic of the anchors illustrated in FIGS. 3 through 10. The principal difference between the structures illustrated in FIGS. 1 and 2 and the remainder of the illustrations is in the configuration of the expansion plug as will be described, and in the depth of bore of the body of the anchor in embodiments of FIGS. 7, 8 and 9. In practically all other respects the anchors are the same.

Reference character 10 in FIG. 1 designates an expansion stud anchor comprising an elongate solid steel member, conveniently made by automatic screw machine techniques from cold-rolled bar stock, for example. There is a bottom expansion part 12, a central shank or body part 14 and a threaded stud part 16. The threaded stud part 16 is intended to protrude from the concrete or masonry body and enables securing an article or a piece of equipment thereto. (For convenience the body of masonry, concrete or stone may hereinafter be referred to as concrete but this is not intended as limiting.)

This position of the anchor in FIG. 1 is with the stud part 16 at the top end and the expansion part 12 at the bottom end but this assumes that the stud anchor 10 is to be driven downwardly into a floor. The anchor can be driven into a ceiling, a wall or an inclined surface, and under any of these conditions it is obvious that the various parts will be disposed differently than shown. Where used in the explanation hereinafter, the word "upper," "top," "bottom," etc., are merely intended to be relative.

The upper end of the threaded stud part 16 has a reduced diameter end 18 which absorbs the blows of a percussive tool used in setting the anchor, without damaging the threads. Some attempts have been made in the illustrations to show mushrooming of the end 18 to indicate some flattening or distortion during setting of the anchor. Because of the reduced diameter end, this does not interfere with the securement of a nut through the stud portion 16, the threads being undamaged.

The central shank or body part 14 is integral with the other parts and is provided with an annular band of knurling at 20 suitably positioned axially relative to the bottom end of the anchor 10 to indicate the depth that the anchor is to be set into the hole for optimum efficacy and holding power of the anchor.

Both of these features, represented by the knurling 20 at a predetermined axial location along the shank 14 and the reduced diameter end 18, are incorporated into the structures illustrative in FIGS. 3–10 inclusive.

The expansion portion 12 of the anchor 10 has several downwardly directed cutting or broaching rings 22, an undercutting ring 24 and one or more axial cuts extending completely through the anchor and providing thereby the slots 26. It will be recalled that the self-drilling shell has grooves instead of completely cut-through slots so that in expansion of the self-drilling shell the cutting end fractures along these grooves. In the case of these stud anchors it has been found that smaller sizes require only one cut through the end thereby providing diametrical slots along opposite sides of the expansion portion 12. A central bore 28 is axially drilled into the axial end of the expansion portion 12 past the broaching rings 22 and, in this case, beyond the slots 26. The entrance to the bore 28 is countersunk as shown at 30 with a relatively flat chamfer, preferably of the order of 120°. This provides a space 50 for debris which occurs during undercutting by the ring 24. More detailed reference to this problem of accommodating cuttings and debris will be made hereinafter.

There is a tapered plug 32 which is intended to be driven into the bore 28 to expand the expansion portion end 12. The plug 32 is best manufactured by so-called cold-heading processes, and preferably is hardened, by any case-hardening process, leaving a softer core. This plug has a central body portion 34, and upper reduced diameter entrant end 36 which is of right cylindrical configuration, and a bottom shouldered flange 38. The diameter of the cylindrical end 36 is such as to have a force fit with the bore 28 so that the manufacturer may assemble the anchor with the plug 32 in place and ship the same in that condition. The diameter of the entrant end 36 is preferably made one or two thousandths of an inch greater than the diameter of the bore 28 so that the bottom end of the bore 28 will forcibly grip the entrant end 36. When used, the plug remains in place while the anchor is being lowered into the hole so that it does not drop out of the anchor and so that its axial disposition relative to the anchor is maintained until it comes to rest on the bottom of the hole preparatory to setting the same. In handling the anchor and plug combination, there are no loose parts to manipulate.

The shouldered flange 38 is about the same diameter as the bottom portion 14 and the inside diameter of the hole and cannot be skewed or canted during installation or setting of the anchor. Obviously, there will have to be some clearance so that it is free to move downwardly into the hole when being installed.

The tapered portion 34 extends from the cylindrical entrant portion 36 to the flange 38 so that its bottom end or root at 39 is of a diameter somewhat less than the diameter of the flange 38 thereby giving rise to a shoulder 40.

In accordance with the copending applications, it was intended that the shoulder 40 serve as stop means adapted to be engaged by the end of the expansion part 12 and this in turn contemplated that all of the tapered portion 34 would enter the bore 28 in expanding the anchor. It was found that this occurred only under practically ideal conditions. It will be appreciated that as the anchor 10 is driven down over the tapered portion 34, the expansion portion 12 spreads and the ring 24 commences undercutting the pre-drilled hole. The cuttings which are scraped from the wall of the hole during the undercutting process accumulate above the flange 40 and, as the end of the portion 12 approaches the flange, these cuttings are accommodated in the annular space 50.

The provision of a space for the cuttings is a feature of the invention of the copending applications as well as the improved forms which will be described hereinafter, but the difference lies in the fact that the illustrations of the copending applications including those which are shown in FIGS. 1 and 2 have the space 50 proportionally quite small and it is quite likely that there will be more cuttings than can be accommodated by a space 50 of this proportional size if the anchor is fully driven down to the flange. The net effect would be that the debris would pack against the flange 40 and lock the plug 32 into the bottom of the hole while at the same time preventing full expansion of the expansion portion 12.

FIG. 2 illustrates a construction of an anchor 10′ which differs from the anchor 10 of FIG. 1 only in the respect that its shank is much shorter. In this view the anchor 10′ has been set into a predrilled hole 42 in the concrete body 44 and a bracket or machinery plate 46 is secured to the surface 48 by means of a threaded nut 50′ and washer 52′ engaging the threaded stud end 16. Note that the upper end 18 is shown somewhat mushroomed as a result of driving the stud anchor 10′ home. It will be seen that the plug 32 has caused expansion of the expansion end 12 which has resulted in the undercutting of the hole.

In FIG. 2 the hole 42 is shown having a relatively flat bottom 52 which would assume that the drill used to drill the hole had a flat end. This, of course, is not always the case. Also, the flange 38 is shown resting directly on the bottom 52 and this assumes that the hole has been fully cleaned out before the anchor was inserted. This would occur in a hole driven into a ceiling and might be done in a carefully cleaned-out hole driven into a wall or floor, but in the latter two cases it is probable that there will be a considerable amount of debris in the hole. The flange 38 will prevent any of this debris from making its way into the space 50 during setting of the anchor.

As indicated above, the space 50 shown is probably too small to enable the anchor 10′ to ride on the tapered portion 34 all the way to the flange shoulder 40. In order to enable this to occur for the particular design of anchor and plug, water may be introduced into the hole 42 which makes a slurry of the cuttings so that they cannot compress and lock the plug 32 in place or prevent full expansion.

Water, of course, is not easily used, and as a matter of fact in overhead installations cannot be used, and hence the instant invention relates to an improvement which provides more space for accommodating cuttings during the setting of the anchor.

Figures 3, 4, 5, 6:
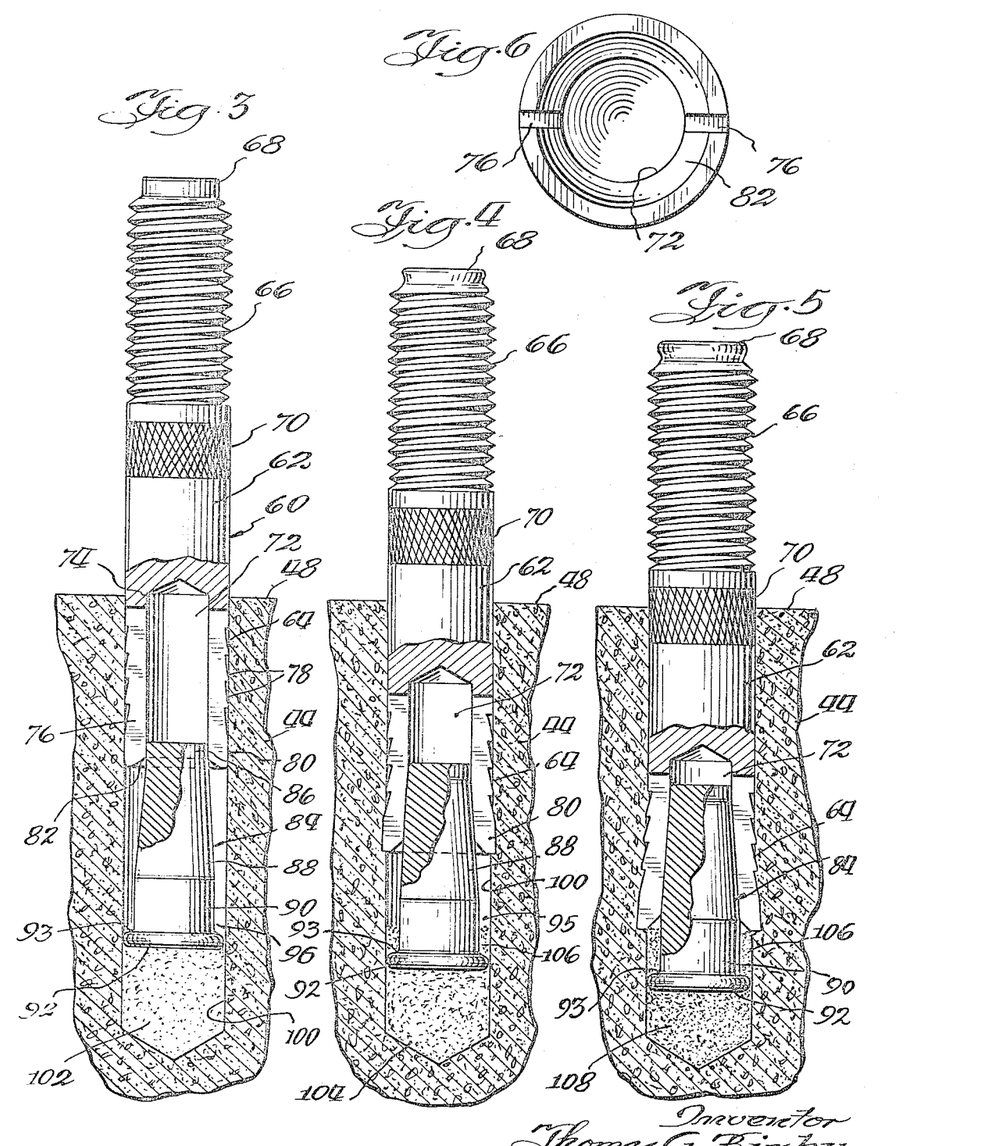
FIG. 3 is a vertical sectional view showing an expansion stud anchor and plug constructed in accordance with the improved form of the invention with portions in elevation, this view illustrating the anchor and plug placed in a drilled hole in which a substantial, amount of debris has remained after drilling the hole, and before the anchor has been set.
FIG. 4 is a view similar to that of FIG. 3 but in this case, the anchor has been partially set.
FIG. 5 is a view similar to that of FIGS. 3 and 4 but in this case, the anchor has been fully set.
FIG. 6 is a bottom end-on plan view of the anchor of FIGS. 3, 4 and 5.

FIG. 3 illustrates an anchor 60 which is being installed in a body 44 of concrete. The anchor 60 has a central shank portion 62, a bottom expansion portion 64, and an upper threaded stud portion 66. The words "bottom," "upper," etc. are only intended to describe relative locations since obviously the anchor 60 may be installed in a wall or ceiling as well as in a floor. The free end of the anchor 60 has a reduced diameter portion 68 which is adapted to receive the blows from a setting tool such as a hammer and as seen in FIGS. 4 and 5 will become somewhat mushroomed during installation of the shell. There is a knurled band 70 which indicates the depth to which the anchor 60 is to be set for best results. The anchor has a central bore 72 in the form of a hole which is drilled in its bottom end, and in this case the hole 72 extends into the anchor 60 to a level 74 that is deeper than the extent of the slots 76 which are cut across the anchor. As shown in FIG. 6 only two such slots are provided resulting from a single cut although four may be provided as the result of two right angle cuts. It will be appreciated that the slots 76 are opened throughout their entire extent. Again as in the case of the anchors 10 and 10′, there are annular broaching rings or teeth 78 and there is an annular undercutting ring 80 at the bottom end of the anchor. The end of the anchor is countersunk at 82, but this countersunk space merely provides a better lead for helping engage the plug in the bore 72. It also somewhat sharpens the leading edge of the undercutting ring 80.

The construction of the expansion plug 84 is substantially different from that of the plug 32. There is a relatively short cylindrical entrant portion 86 which again makes an interference fit with the bore 72 so that the manufacturer may tightly engage the plug 84 into the bore and ship the anchor and plug in this assembled condition. The user also has great convenience because of this arrangement. Immediately below the cylindrical entrant portion 86 there is a tapered section 88, the taper of which may be of the order of 8° or so, it being found that this small taper seems to give the best results. The tapered section 88 merges with a cylindrical section 90 that terminates in the flange 92 at the bottom of the plug. As a result of the provision of a cylindrical section 90, the root diameter 93, which is the equivalent of the root diameter 39 of FIG. 1 is substantially less for any given size hole than if the taper 88 had been continued all the way to the flange 92. Because of this construction, there is an elongate annular cylindrical space or chamber of substantial dimension provided around the cylindrical section 90 which is shown at 95 between it and the wall of the hole. The engagement of the expansion portion 64 with the tapered section 88 is of sufficient frictional engagement so that when the anchor is driven home over the tapered section 88 and to no substantial extent further, the resulting undercutting and expansion of the bottom end of the anchor will hold the anchor tightly in its hole. As the threaded portion 66 is taken up by a suitable nut, the attempted withdrawal of the anchor from its hole wedges the expansion portion 64 radially inward and very tightly against the expansion plug 84 with great force. Since the remainder of the hole is smaller in diameter than the expanded anchor this will result in a very secure engagement.

In this instance, it has been assumed that a hole 100 has been drilled in the concrete body 44 by means of a drill having a conical end to result in the configuration of said hole shown in FIGS. 3 to 5. It also has been assumed that a substantial portion of the resulting debris of drilling the hole has remained in the hole 100 and this debris is shown at 102. This debris is fairly powdery and is somewhat loose or fluffy. In FIG. 3 the anchor has been placed in the hole without cleaning same out after drilling and the flange 92 has been pressed down on top of the loose cuttings 102. In FIG. 4 the installer has commenced driving the anchor into the hole to set the same. The cuttings in the bottom of the hole are now compressed tighter than in FIG. 3 and are designated 104. The tapered portion 88 of the plug has now partially entered into the bore 72 and as the anchor body moves downwardly, the undercutting ring 80 has been cutting away at the sides of the hole 100 and the debris or cuttings are falling into the space or chamber 95 and commence to filing the same. The cuttings resulting from the undercutting action are indicated at 106.

In FIG. 5 the tapered section 88 has entered the bore 72 fully, the expansion portion 64 has expanded and substantially undercut the hole and the space 95 has filled even further with more of the debris and cuttings 106. The original cuttings left from the formation of the hole under the flange 92 are now even further compressed as shown at 108.

From FIG. 5 it will be seen that the plug 84 does not fully enter the bottom end of the anchor body but protrudes therefrom by an amount governed by the thickness of the flange 92 and most of the length of the cylindrical section 90. The bore 72, as previously mentioned, is longer than the slots 76 and is also substantially longer than the depth to which the plug 84 is to be driven for optimum holding power. Some leeway is provided for ease of manufacture. Many conditions of the concrete or masonry will permit of some overdriving without loss of holding power.

The action of the plug 84 during taking up of the stud end 66 obviously contemplates at least some slight axial movement out of the hole. Where the plug and anchor body have been tightly wedged together, both of them move, and the resulting reaction of the hole wall on the expanded portion makes the connection between anchor body and plug even tighter. If the plug is locked in the bottom end of the hole, as by compressed cuttings packed in on top of the flange 92, the first movement of the anchor in take-up may separate the plug from its anchor and enable the anchor body to be pulled up. The space or chamber 95 obviates this by providing more than enough volume to accommodate the cuttings. The dimensions of the anchor 60 and plug 84 relative to the diameter of the hole 100 are chosen to give a volume for the space or chamber 95 which is approximately two times the volume of concrete cut by the undercutting ring 80 during setting, this volume being the final volume of space or chamber 95. This ensures full expansion of the anchor and no locking of the plugs into the bottom of the hole.

In FIGS. 3, 4 and 5 the knurling band 70 indicates the depth to which the anchor 60 is to be set for a condition that some debris and cuttings remain in the hole under the flange 92. For ceiling installations, obviously the installer would be instructed to drill a shorter depth hole because no cuttings will remain in the hole and the knurling band 70 will still indicate optimum setting depth. Instructions can be given with reference to the band 70 in order to advise the user in the manner of setting the anchor. The optimum depth would be when the surface 48 is at about the midpoint of the knurled band.

Figure 7:
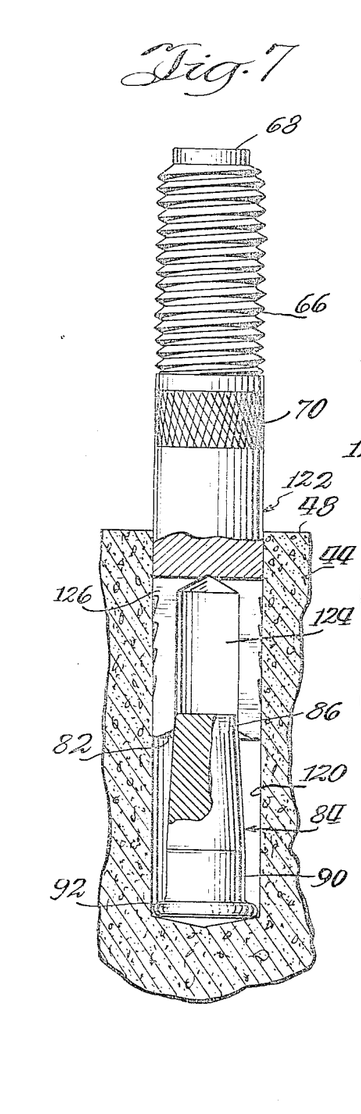
FIGS. 7, 8 and 9 are views similar to those of FIGS. 3, 4 and 5, respectively, but differ therefrom in the respect that it has been assumed in this instance that the drilled hole has been completely cleaned of debris, and in addition the anchor is of somewhat modified form.
Figures 8, 9, 10:
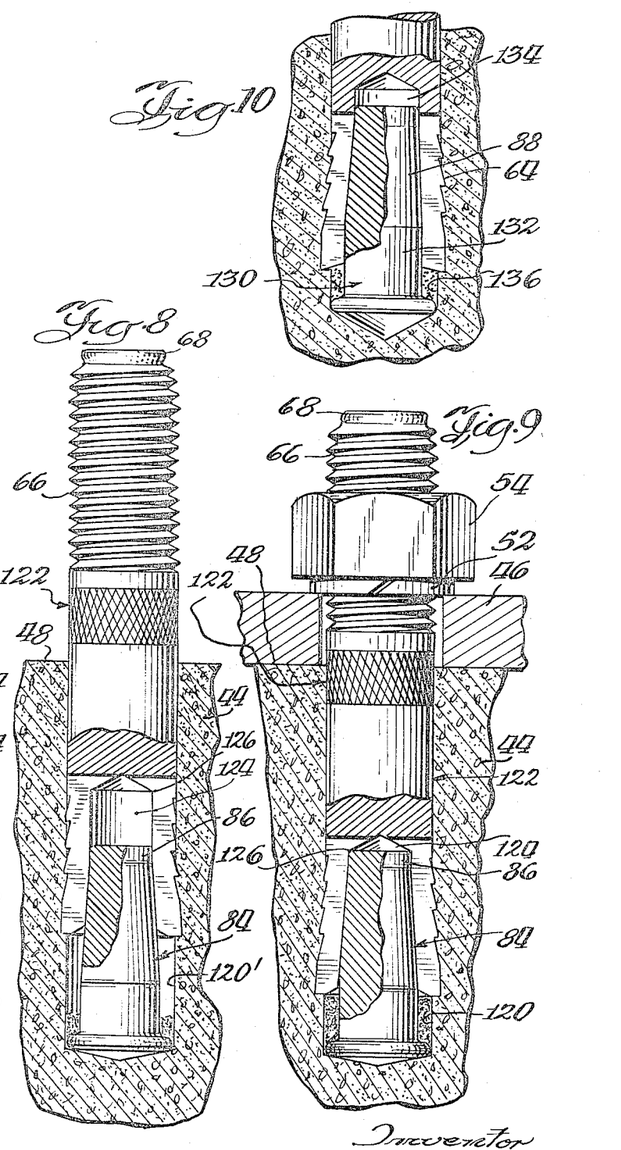
FIG. 10 is a fragmentary view similar to the bottom of FIG. 9, but showing a still further modified form of the invention in fully set condition.

In FIGS. 7, 8 and 9 it has been assumed that the hole 120 has been drilled by a drill that has a somewhat flatter bottom end and also it has been assumed that the hole has been fully cleaned out before the anchor has been inserted, or that the hole has been drilled in the underside of a ceiling or roof. For a hole in a floor, for example, which is not cleaned out, and into the debris of which the anchor 122 with its plug 84 are adapted directly to be inserted, the depth will be greater than hole 120 shown.

The anchor 122 of FIGS. 7, 8 and 9 differs from the anchor 60 of FIGS. 3, 4 and 5 only in one respect. In the anchor 122 the hole 124 which forms the hollow bore and is equivalent to the hole 72, is drilled a predetermined depth indicated at 126 so that it is impossible for the plug 84 to enter the anchor any further than to the depth needed for opimum holding power. The cylindrical entrant portion 82 of the plug 84 therefore bottoms in the hole 124 when the anchor is fully set. As mentioned in the objects above, as soon as the plug bottoms in the bore, the resistance of the anchor to the hammer blows increases substantially and can be sensed by the workman. Also, this prevents a heavy-handed workman from oversetting the anchor in its hole.

In all other respects the anchor 122 is substantially the same as anchor 60, and the plug 84 of FIGS. 7, 8 and 9 is substantially the same as the plug 84 of FIGS. 3, 4 and 5.

FIG. 10 illustrates a modified form of plug 130 in which the cylindrical section 132 is longer proportionally than the section 90 of FIGS. 3, 4, 5, 7, 8 and 9, while the tapered section 88 is shorter.

In this case, as the anchor is set, the plug 130 enters the bore 134, expands the expansion portion 64 which undercuts the hole 136 and engages over about half of the cylindrical section 132 in a frictional engagement. This type of an arrangement is probably more effective in extremely hard masonry since, for the most part, the efficiency of an anchor of this type may be decreased because of the likelihood of locking the plug 130 into the hole 136 through compression of the cuttings in the small space available.

Variations of the details of the invention are capable of being made without departing from the spirit or scope of the invention as set forth in the appended claims.

What it is desired to secure by Letters Patent of the United States is:

1. An expansion stud anchor adapted to be set into a predrilled hole in a body of concrete or the like which comprises: an elongate solid steel integral member of substantially the same outer diameter throughout its length and having a central shank portion, a stud end adapted to protrude from the hole when the anchor has been set, and an expansion end opposite the stud end, the expansion end having broaching rings, an end undercutting ring, a central blind end axial bore extending partially into said member and axial slots dividing same into circumferential segments to permit expansion, a steel expansion plug adapted to be driven into the bore during setting of the anchor and comprising a conical tapered portion at one end, an integral cylindrical portion of diameter the same as and connected with the largest diameter of the tapered portion, and an integral flange at the second end of the plug, the anchor adapted to be set with the plug driven into the bore over the tapered portion with a substantial axial length of the lower cylindrical portion protruding, the flange having a diameter substantially the same as that of the said member and the said integral cylindrical portion being substantially less in diameter than that of the flange whereby when the anchor is set there will be an annular cylindrical space between the cylindrical section and the hole to accommodate the cuttings from the undercutting action of the undercutting ring with substantially no adverse compression effects thereof between the expansion end and the flange, the tapered portion being of a length and conical taper dimensions relative to the diameter of the bore such that when driven into the bore over said tapered portion, said plug will lock into the bore while the expansion end will have expanded and undercut the hole sufficiently to secure the anchor within said hole.

2. An expansion anchor as claimed in claim 1 in which the plug has an integral cylindrical entrant portion connected to the smaller diameter end of the tapered portion of a diameter to enable same tightly to be engaged in the entrance of the bore so that the plug may be connected with and axially aligned with the said member prior to introduction of the anchor into the hole for setting.

3. An expansion stud anchor fixedly secured to a concrete or the like body within a predrilled cylindrical hole in said body, and comprising:
   (A) an elongate steel body member having
      (i) a solid central cylindrical shank of substantially uniform diameter throughout its length of substantially the diameter of the predrilled hole into which said anchor is secured, with a stud end protruding out of the hole and an expansion section at the end opposite the stud end disposed on the interior of the hole;
      (ii) the expansion end being slotted axially
      (iii) and having axially spaced annular broaching rings on its exterior which have sharp edges directed toward the expansion end so as to exert a cutting action on the walls of the hole when the anchor is expanded;
      (iv) the expansion end also having an undercutting ring producing an undercutting action as said end is expanded while the anchor is being driven into said hole;
      (v) the expansion end having a central blind end axial bore which extends part-way into said body member;
   (B) a steel expansion plug having
      (i) at least a conical tapered part between the ends thereof,
      (ii) a reduced diameter entrant portion on one end thereof driven into the bore during the setting of the anchor and being connected to the tapered part to lead the tapered part into said bore, (iii) a shouldered flange at the end of the plug opposite said one end and said flange being of a diameter substantially the same as the shank, (iv) the largest diameter of the tapered part being less than the diameter of said flange, (v) the tapered part being of a length and conical taper dimensions relative to the diameter of the bore such that when driven into the bore to an extent that substantially all of the tapered part is engaged within the body, the plug will lock into the bore while the expansion end will have expanded and undercut the hole sufficiently to secure the anchor within said hole; and (C) the anchor being fixed in said hole with the flange substantially spaced from the expansion end so as to provide an annular chamber defined by the inner surface of the hole around the plug between the plug and said expansion end accommodating the cuttings produced during setting.

4. An expansion anchor secured to a body as claimed in Claim 3 in which the entrant portion comprises a short cylindrical section of a diameter having an interference fit with the bore, and the said entrant portion being tightly engaged in said bore prior to the insertion of the anchor into the predrilled hole.

5. An expansion stud anchor fixedly secured to a concrete or the like body within a predrilled cylindrical hole in said body, and comprising:

(A) an elongate steel body member having
 (i) a solid central cylindrical shank of substantially uniform diameter throughout its length of substantially the diameter of the predrilled hole into which said anchor is secured, with a stud end protruding out of the hole and an expansion section at the end opposite the stud end disposed on the interior of the hole;
 (ii) the expansion end being slotted axially
 (iii) and having axially spaced annular broaching rings on its exterior which have sharp edges directed toward the expansion end so as to exert a cutting action on the walls of the hole when the anchor is expanded;
 (iv) the expansion end also having an undercutting ring producing an undercutting action as said end is expanded while the anchor is being driven into said hole;
 (v) the expansion end having a central blind end axial bore which extends part-way into said body member;

(B) a steel expansion plug having
 (i) at least a conical tapered part between the ends thereof,
 (ii) a reduced diameter entrant portion on one end thereof driven into the bore during the setting of the anchor and being connected to the tapered part to lead the tapered part into said bore,
 (iii) a shouldered flange at the end of the plug opposite said one end and said flange being of a diameter substantially the same as the shank,
 (iv) the largest diameter of the tapered part being less than the diameter of said flange,
 (v) the tapered part being of a length and conical taper dimensions relative to the diameter of the bore such that when driven into the bore to an extent that substantially all of the tapered part is engaged within the body, the plug will lock into the bore while the expansion end will have expanded and undercut the hole sufficiently to secure the anchor within said hole;

(C) the anchor being fixed in said hole with the flange substantially spaced from the expansion end so as to provide an annular chamber defined by the inner surface of the hole around the plug between the plug and said expansion end accommodating the cuttings produced during setting; and (D) said shank having a knurled band thereon at a predetermined axial position to enable gauging the proper depth of setting of said anchor for producing said spacing of the flange to produce said annular chamber of a length which is a substantial fraction of the length of the plug.

6. An expansion stud anchor adapted to be fixedly secured in a predrilled cylindrical hole in a concrete or the like body, and comprising:

(A) an elongate steel body member having
 (i) a solid central cylindrical shank of substantially uniform diameter throughout its length of substantially the diameter of the predrilled hole into which said anchor is to be secured, with a threaded stud end adapted to protrude out of the hole and an expansion section at the end opposite the stud end adapted to be disposed on the interior of the hole;
 (ii) the expansion end being slotted axially;
 (iii) the expansion end also having undercutting means to produce an undercutting action as said end is expanded while the anchor is being driven into said hole;
 (iv) the expansion end having a central blind end axial bore which extends part-way into said body member; and (B) a steel expansion plug having
 (i) at least a conical tapered part formed between the ends thereof,
 (ii) a reduced diameter entrant end adapted to be driven into the bore during the setting of the anchor and being adjacent to the smaller diameter end of the tapered part to lead the tapered part into said bore,
 (iii) a shouldered flange at the end of the plug opposite said entrant end and said flange being of a diameter greater than the diameter of the bore and at most, of a diameter substantially the same as the shank,
 (iv) a connecting section between the larger diameter end of the tapered part and the flange,
 (v) the largest diameter of the connecting section and tapered part being substantially less than the diameter of the flange, the plug adapted to be driven a distance part-way into the bore during setting to the extent that the tapered part is substantially within said body with the flange spaced a substantial distance axially from the expansion end, the configuration of the connecting section of the plug being such as to provide an annular chamber of substantial volume between the plug and the wall of said hole within which said anchor is adapted to be installed such as to permit cuttings produced by the undercutting of the hole to be accommodated between said flange and expansion end in said chamber when the plug is set without packing and locking the plug in the hole independently of the body and
 (vi) the tapered part being of a length and conical taper dimensions relative to the diameter of the bore such that when driven said distance into the bore to the extent that the tapered part is substantially within said body, the tapered part will contact said bore in a locking engagement and in the process of moving into the bore will expand the said expansion end and undercut the hole sufficiently to secure the anchor within the hole.

7. An expansion stud anchor adapted to be set into a predrilled hole in a body of concrete or the like which comprises: an elongate solid steel integral member of substantially the same outer diameter throughout its length and having a central shank portion, a stud end adapted to protrude from the hole when the anchor has been set, and an expansion end opposite the stud end, the expansion end having broaching rings, an end undercutting ring, a central blind end axial bore extending partially into said member and axial slots dividing same into circumferential segments to permit expansion, a steel expansion plug adapted to be driven into the bore during setting of the anchor and comprising a conical tapered portion at one end of said plug, an integral cylindrical portion of diameter the same as and connected with the largest diameter of the tapered portion, and an integral flange at the second end of the plug, the stud anchor adapted to be set with the plug driven into the bore over the tapered portion with a substantial axial length of the lower cylindrical portion protruding, the flange having a diameter substantially the same as that of the said shank member and the said integral cylindrical portion being substantially less in diameter than that of the flange whereby when the anchor is set there will be an annular cylindrical space between the cylindrical section and the hole to accommodate the cuttings from the undercutting action of the undercutting ring with substantially no adverse compression effects thereof between the expansion end and the flange, the tapered portion being of a length and conical taper dimensions relative to the diameter of the bore such that when driven into the bore over said tapered portion, said plug will lock into the bore while the expansion end will have expanded and undercut the hole sufficiently to secure the anchor within said hole, the depth of the bore being at most slightly more than the axial length of the plug exclusive of the cylindrical portion and flange whereby during setting of the anchor the plug may be driven its full limit into the said member and as a result thereof the tapered portion of the plug will fully enter the bore and substantially all of the lower cylindrical portion will protrude therefrom.

8. An expansion stud anchor adapted to be set into a predrilled hole in a body of concrete or the like which comprises: an elongate solid steel integral member of substantially the same outer diameter throughout its length and having a central shank portion, a stud end adapted to protrude from the hole when the anchor has been set, and an expansion end opposite the stud end, the expansion end having broaching rings, an end undercutting ring, a central blind end axial bore extending partially into said member and axial slots dividing same into circumferential segments to permit expansion, a steel expansion plug adapted to be driven into the bore during setting of the anchor and comprising a conical tapered portion at one end of said plug, an integral cylindrical portion of diameter the same as and connected with the largest diameter of the tapered portion, and an integral flange at the second end of the plug, the stud anchor adapted to be set with the plug driven into the bore over the tapered portion with a substantial axial length of the lower cylindrical portion protruding, the flange having a diameter substantially the same as that of the said member and the said integral cylindrical portion being substantially less in diameter than that of the flange whereby when the anchor is set there will be an annular cylindrical space between the cylindrical section and the hole to accommodate the cuttings from the undercutting action of the undercutting ring with substantially no adverse compression effects thereof between the expansion end and the flange, the tapered portion being of a length and conical taper dimensions relative to the diameter of the bore such that when driven into the bore over said tapered portion, said plug will lock into the bore while the expansion end will have expanded and undercut the hole sufficiently to secure the anchor within said hole, said plug having an integral cylindrical entrant portion connected to the smaller diameter end of the tapered portion and of a diameter to tightly fit into the entrance of the bore before expanding the anchor, and the depth of the bore being substantially the same as the axial length of the tapered portion and entrant portion combined so that when set with the plug driven to its maximum extent into the bore, substantially all of the lower cylindrical portion will protrude from the anchor.

9. An expansion stud anchor adapted to be fixedly secured in a predrilled cylindrical hole in a concrete or the like body, and comprising:
  (A) an elongate steel body member having
    (i) a solid central cylindrical shank of substantially uniform diameter throughout its length of substantially the diameter of the predrilled hole into which said anchor is to be secured, with a threaded stud end adapted to protrude out of the hole and an expansion section at the end opposite the stud end adapted to be disposed on the interior of the hole;
    (ii) the expansion end being slotted axially
    (iii) the expansion end also having an undercutting ring to produce an undercutting action as said end is expanded while the anchor is being driven into said hole;
    (iv) the expansion end having a central blind end axial bore which extends part-way into said body member; and
  (B) a steel expansion plug having
    (i) at least a conical tapered part between the ends thereof,
    (ii) a reduced diameter entrant portion on one end thereof adapted to be driven into the bore during the setting of the anchor and being connected to the tapered part to lead the tapered part into said bore,
    (iii) a shouldered flange at the end of the plug opposite said one end and said flange being of a diameter substantially the same as the shank,
    (iv) the largest diameter of the tapered part being less than the diameter of said flange,
    (v) said plug adapted to be driven into the bore during setting to the extent that the tapered part is within the bore and there is a substantial portion of the plug between the tapered part and the flange which will be protruding, and said substantial portion being of lesser diameter than said flange and having a configuration which when combined with the wall of said hole within which said anchor is installed will form an annular chamber to accommodate cuttings produced by the undercutting of the hole, said chamber being defined between the flange and the said expansion end and
    (vi) the tapered part being of a length and conical taper dimensions relative to the diameter of the bore such that when driven into the bore to an extent that substantially all of the tapered part is engaged within the body, the plug will lock into the bore while the expansion end will have expanded and undercut the hole sufficiently to secure the anchor within said hole and said plug and body having means to limit entry of the plug into said bore to such extent thereby to assure formation of such chamber.

10. An expansion anchor as claimed in claim 9 in which said means to limit entry comprises an integral cylindrical portion formed between the tapered part and flange of a diameter substantially less than that of said flange whereby to provide a generally annular space above the flange which, when combined with the wall of the hole into which said anchor is installed will form said chamber to accommodate cuttings produced by the undercutting of said hole during setting of the anchor, said elongate steel body member adapted to be driven over the tapered part without materially decreasing said annular chamber and remaining substantially axially spaced from the flange while in finally installed condition.

11. An expansion stud anchor adapted permanently to be scured in a predrilled cylindrical hole in a concrete or the like body, and comprising:
   (A) an elongate steel body member having
      (i) a solid central cylindrical shank of substantially uniform diameter throughout its length of substantially the diameter of the predrilled hole into which said anchor is to be secured, with a threaded stud end adapted to protrude out of the hole and an expansion section at the end opposite the stud end adapted to be disposed on the interior of the hole;
      (ii) the expansion end being slotted axially,
      (iii) the expansion end also having means to produce an undercutting action as said end is expended while the anchor is being driven into said hole by percussion applied to said stud end;
      (iv) the expansion end having a central blind end axial bore which extends a predetermined axial distance into said body member;
   (B) a steel expansion plug having
      (i) a conical tapered part having a small end and a large end,
      (ii) the small end adapted to be driven into the bore during setting of the anchor to lead the conical part into the bore and expand the expansion end,
      (iii) the large end being of a diameter substantially greater than said bore but substantially smaller than said shank,
      (iv) said plug having an integral extension formed as a continuation of said large end and of substantially the same diameter as said large end, whereby when said anchor is installed and the tapered part is disposed within the bore there will be a substantial annular space formed between the extension and the hole wall and between the expansion end and the protruding end of the plug to accommodate cuttings caused by undercutting action,
      (v) said extension having radially extending enlargement on the end thereof opposite the conical tapered part of a diameter substantially the same as that of said shank,
      (vi) the tapered part being of a length and conical taper dimensions relative to the diameter of the bore such that when driven into the bore to an extent that substantially all of the tapered part is engaged within the body, the plug will lock into the bore while the expansion end will have expanded and undercut the hole sufficiently to secure the anchor within said hole and
   (C) means to prevent entry of the plug into the bore to any material extent past the tapered part whereby to assure the formation of said annular space, comprising
      (i) said predetermined axial distance of said central axial bore being substantially less than the overall axial length of the plug, and
      (ii) being at least as great as the axial length of the conical tapered part.

12. An expansion anchor as claimed in claim 11 in which said central axial bore is substantially the same length as the axial length of the plug from the large end of the tapered part to the end closest to the small end of the tapered part.

13. An expansion stud anchor adapted to be fixedly secured in a predrilled cylindrical hole of predetermined depth in a concrete or the like body, and comprising:
   (A) an elongate steel body member having
      (i) a solid central cylindrical shank of substantially uniform diameter throughout its length of substantially the diameter of the predrilled hole into which the anchor is to be secured, with a threaded stud end adapted to protrude out of the hole and an expansion section at the end opposite the stud end adapted to be disposed on the interior of the hole;
      (ii) the expansion end being slotted axially;
      (iii) the expansion end also having undercutting means to produce an undercutting action as said end is expanded while the anchor is being driven into said hole;
      (iv) the expansion end having a central blind end axial bore which extends part-way into the body member; and
   (B) a steel expansion plug having
      (i) a conical tapered part;
      (ii) a reduced diameter entrant end at the smallest diameter of said tapered part adapted to be driven into the bore during the setting of the anchor to lead the tapered part into the bore during setting of the anchor;
      (iii) a shouldered flange at the end of the plug opposite the said entrant end and being of a diameter greater than the diameter of said bore and at most of a diameter substantially the same as the shank;
      (iv) a cylindrical section between the largest diameter end of the tapered part and the flange and the cylindrical section being of a diameter less than that of the flange whereby to form the shoulder at the flange and to form a substantial annular space for accommodating cuttings around the cylindrical section, between the cylindrical section and the wall of the hole within which the anchor is adapted to be set, and between the flange and the expansion end; and
      (v) the axial length of said plug between the cylindrical section and the entrant end being approximately the same as the depth of the bore so that when the anchor is set the plug is driven into the bore not to any substantial extent beyond the tapered section whereby to ensure the formation of said annular space; and
      (vi) the tapered part being of a length and conical taper dimensions relative to the diameter of the bore such that when driven into the bore to an extent that substantially all of the tapered part is engaged within the body, the plug will lock into the bore while the expansion end will have expanded and undercut the hole sufficiently to secure the anchor within said hole.

14. An expansion stud anchor adapted to be fixedly secured in a predrilled cylindrical hole of predetermined depth in a concrete or the like body, and comprising:
   (A) an elongate steel body member having
      (i) a solid central cylindrical shank of substantially uniform diameter throughout its length of substantially the diameter of the predrilled hole into which the anchor is to be secured, with a threaded stud end adapted to protrude out of the hole and an expansion section at the end oposite the stud end adapted to be disposed on the interior of the hole;
      (ii) the expansion end being slotted axially;
      (iii) the expansion end also having undercutting means to produce an undercutting action as said end is expanded while the anchor is being driven into said hole;
      (iv) the shank having indicating means thereon to indicate the depth to which the anchor is properly to be set;
      (v) the expansion end having a central blind end axial bore which extends part-way into the body member; and
(B) a steel expansion plug having
  (i) a conical tapered part;
  (ii) a reduced diameter entrant end at the smallest diameter of said tapered part adapted to be driven into the bore during the setting of the anchor to lead the tapered part into the bore during setting of the anchor;
  (iii) a shouldered flange at the end of the plug opposite the said entrant end and being of a diameter greater than the diameter of said bore and at most of a diameter substantially the same as the shank;
  (iv) a cylindrical section between the largest diameter end of the tapered part and the flange and the cylindrical section being of a diameter less than that of the flange whereby to form the shoulder of the flange and to form a substantial annular space for accommodating cuttings around the cylindrical section, between the cylindrical section and the wall of the hole within which the anchor is adapted to be set, and between the flange and the expansion end; and
  (v) the axial length of the plug between the cylindrical section and the entrant end being such that when the anchor is set up to the indicating means the plug enters the bore only to such an extent as to ensure formation of said annular space; and
  (vi) the tapered part being of a length and conical taper dimensions relative to the diameter of the bore such that when driven into the bore to an extent that substantially all of the tapered part is engaged within the body, the plug will lock into the bore while the expansion end will have expanded and undercut the hole sufficiently to secure the anchor within said hole.

References Cited

UNITED STATES PATENTS

| | | | |
|---|---|---|---|
| 494,745 | 4/1893 | Phillips | 85—77 |
| 690,284 | 12/1901 | Hicks | 85—84 |
| 747,219 | 12/1903 | Preslar | 85—84 |
| 751,902 | 2/1904 | Dodge | 85—82 |
| 1,000,715 | 8/1911 | Caywood | 85—83 |
| 1,137,443 | 4/1915 | Ackerman | 85—74 |
| 1,164,322 | 12/1915 | Yeatman | 85—74 |
| 1,220,024 | 3/1917 | Tanzi | 85—84 |
| 1,251,566 | 1/1918 | Piogott | 85—26 |
| 1,372,291 | 3/1921 | Jacobs | 85—77 |
| 1,474,154 | 11/1923 | Kohler | 85—69 |
| 1,621,598 | 3/1927 | Phillips | 85—68 |
| 1,695,303 | 12/1928 | Tomkinson | 85—70 |
| 1,762,349 | 6/1930 | Phillips | 85—68 |
| 1,850,768 | 3/1932 | Peirce | 85—74 |
| 1,953,172 | 4/1934 | Griffiths | 103—216 |
| 1,996,121 | 4/1935 | Phillips | 85—68 |
| 2,120,577 | 6/1938 | Schulte | 85—75 |
| 2,140,919 | 12/1938 | Mushet | 85—68 |
| 2,203,178 | 6/1940 | Peirce | 85—70 |
| 2,302,590 | 11/1942 | Waite | 85—84 |
| 2,313,522 | 3/1943 | Dinnes | 85—14 |
| 2,358,783 | 7/1944 | Best | 85—74 |
| 2,667,037 | 1/1954 | Thomas et al. | 85—84 |
| 2,900,863 | 8/1959 | Maynard | 85—83 |
| 2,963,935 | 12/1960 | Shields | 85—68 |
| 3,007,364 | 11/1961 | Dickie | 85—74 |
| 3,107,570 | 10/1963 | Zifferer et al. | 85—83 |
| 3,122,049 | 2/1964 | Dieterich et al. | 85—83 |

FOREIGN PATENTS

| | | |
|---|---|---|
| 1,010,775 | 10/1948 | France. |
| 19,173 | 9/1903 | Great Britain. |
| 15,163 | 6/1909 | Great Britain. |

CARL W. TOMLIN, *Primary Examiner.*

M. PARSONS, JR., *Assistant Examiner.*